2,985,678
TERT.-ALKYL ALKOXY SILANES AND PREPARATION THEREOF

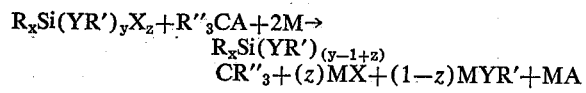

Cecil C. Chappelow, Jr., Kansas City, Mo., and John T. Goodwin, Jr., Alexandria, Va., assignors, by mesne assignments, to Ethyl Corporation, New York, N.Y., a corporation of Delaware No Drawing. Filed Nov. 27, 1957, Ser. No. 699,162

7 Claims. (Cl. 260—448.8)

This invention relates to organic esters of silicon wherein at least one of the valences of silicon is linked directly to a tertiary carbon atom.

The commercial utilization of organic silicon compounds is based primarily upon the production of silicon monomers containing the phenyl and methyl radicals. Although many different hydrocarbon radicals have been linked to silicon, it is well settled that the employment of the higher alkyl or aryl radicals in silicon compounds progressively lowers the stability of these compounds to the point of little usefulness commercially. However, an exception is the tertiary butyl radical which has been found to increase the stability of silicon compounds.

Heretofore the development of silicon compounds containing a tertiary carbon to silicon linkage has been stifled by the lack of convenient methods for their preparation. For example, one method for the preparation of the silicon tertiary alkyl linkage is disclosed in U.S. 2,626,270. The process consists of two steps as represented by the following equations:

(Step 1) t-BuCl+2Li→t-BuLi+LiCl
(Step 2) t-BuLi+SiCl$_4$→t-BuSiCl$_3$+LiCl

Purity of reagents and reaction conditions are very critical to the method disclosed. Furthermore, all of the following factors are considered important in successfully carrying out the reaction. The lithium must have a large oxide-free surface area, a pentane solvent must be employed; and the solvent and tertiary butyl chloride must be thoroughly purified. Additionally, high speed stirring is necessary, preferably in a baffled reaction vessel, and the reaction periods are of long duration.

It is thus an object of this invention to provide an improved process for the preparation of silicon compounds wherein at least one of the valences of silicon is linked directly to a tertiary carbon atom. It is a further object of this invention to prepare silicon monomers in a simple, straightforward, and commercially adaptable process. Likewise, it is an object of this invention to utilize such common materials as the alkali metals sodium or potassium and the readily obtainable esters of silicon. Moreover, it is an object of this invention to provide new and useful compositions of matter having interesting and unusual properties.

These and other objects which shall appear hereinafter are accomplished by reacting an alkali metal selected from the group consisting of sodium and potassium, an organic ester of silicon, and an alkylating agent comprising an organic ester of an inorganic acid; said organic substituent being a hydrocarbon group free from substituents reactive with the aforesaid alkali metals and attached directly to the inorganic functional group of the aforesaid inorganic acid through a tertiary carbon atom. This process is preferably conducted at a temperature between about 90° to 200° C. The process of this invention is more fully illustrated by the following general formula:

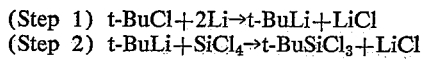
$$R_xSi(YR')_yX_z + R''_3CA + 2M \rightarrow$$
$$R_xSi(YR')_{(y-1+z)}$$
$$CR''_3 + (z)MX + (1-z)MYR' + MA$$

wherein R, R', and R'' are hydrocarbon groups which may be the same or different, selected from the group consisting of alkyl and aryl radicals, or combinations thereof and free from substituents reactive with alkali metals; Y is a chalkogen—that is, an atom selected from the group consisting of oxygen and sulfur; M is an alkali metal selected from the group consisting of sodium and potassium; A is a functional group of an inorganic acid, that is an anion; X is a halogen; $x$ is an integer having a value of 0 or 1; $y$ is an integer having a value of 3 or 4; $z$ is an integer having a value of 0 or 1; and the quantity $x+y+z$ is equal to the valence of silicon. In most cases it is preferred to employ as reactants in the process of this invention organic esters of silicon selected from the group consisting of alkoxy and aryloxy silanes of the general type $R_xSi(OR')_yX_z$ wherein R and R' are hydrocarbon groups which may be the same or different, containing between about 1 to 10 carbon atoms and free from substituents reactive with alkali metals; X is a halogen preferably chlorine; and $x$, $y$, and $z$ are as defined hereinbefore. Furthermore, it is preferred to employ as an alkylating agent in the process of this invention a tertiary alkyl halide wherein said halide is attached directly to the tertiary carbon atoms and said alkyl substituent is a lower alkyl containing between about 1 to 6 carbon atoms, the tertiary butyl group being especially preferred. Although the temperatures employed in the process of this invention can vary between about 90 to 200° C., it is especially preferred to employ reaction temperatures between about 100 to 120° C. and more specifically between about 105 to 115° C. Thus, the most preferred embodiment of the process of this invention is the reaction between a composition of the general type Si(OR)$_4$, wherein R is a lower alkyl hydrocarbon radical containing between about 1 to 5 carbon atoms; sodium and tertiary butyl chloride; said method being conducted at a temperature between about 100 to 120° C.

Certain novel features of the process of this invention are noteworthy. For example, some of the results achieved by the process of this invention in the light of present knowledge are surprising. To illustrate, it is well known that the organic esters of silicon, such as the tetra alkoxysilanes or the alkyl trialkoxy silanes, employed in the process of this invention, are less reactive than their chloride derivatives. Moreover, it is known that the reaction between tetrachlorosilane or methyl trichlorosilane, sodium and tertiary butyl chloride cannot be initiated even when reaction levels and conditions analogous to the process of this invention are employed. It is thus unusual that a reaction employing the less reactive organic esters of silicon can be effected at all and surprising that it can be carried out at the rapid rates and high yields achieved through the process of this invention. Another feature contributing to the novelty of this invention is the use of elevated temperatures, and yet avoiding the production of large quantities of undesirable by-product. Heretofore substitution reactions between silicon derivatives and organo alkali metal reagents have been conducted at low temperatures to suppress the undesirable side reactions. This fact resulted in inordinately long reaction time and low utilization of reaction vessel capacity. Moreover, the desirability of employing relatively high temperatures is clearly not expected since organo sodium and potassium compounds are formed as intermediates and these intermediates would be expected to be destroyed in the process of this invention. Ordinarily reactions employing these reactants, in contrast to the process of this invention, are effected at temperatures below room temperature.

By the process of this invention, compounds of silicon containing tertiary carbon atoms are synthesized which display thermal and stability characteristics comparable to those of the phenyl and methyl derivatives, but which also, in contrast to those silicon compounds, display excellent hydrocarbon characteristics, such as compatibility with other organic materials and good lubricating properties. Moreover, these tertiary carbon containing silicon compounds are very attractive economically because of their high molecular weight.

The following compounds are typical but non-limiting examples of products produced by the process of this invention: tert-butyltrimethoxysilane, tert-butyltriethoxysilane, tert-butyltriisopropoxysilane, tert-butyltripentoxysilane, tert-butyltrieicosoxysilane, tert-butyltripropylthiosilane, tert-butyltridecylthiosilane, di-tert-butyldimethoxysilane, di-tert-butyldiphenoxysilane, bis(2-methyl-2-butyl)-dimethoxysilane, di-tert-butylmethoxytoloxysilane, di-tert-butyldimethylthiosilane, (2-phenyl-2-propyl) - tert-butyldimethoxysilane, di-tert-butyldihexadecoxysilane, tert-butylmethyldimethoxysilane, tert-butylphenyldimethoxysilane, [2-(o-tolyl)-2-propyl]-tert-butyldimethoxysilane, tert-butylethyldimethoxysilane, tert - butylanthryldimethoxysilane, (2 - phenyl - 2 - propyl)trimethoxysilane, (2-phenyl-2-butyl)trimethoxysilane, (2,3-dimethyl-2-butyl)-trimethoxysilane. Furthermore, the hydrocarbon radicals of the compounds produced in the process of this invention can be substituted with such substituents as the alkoxy, aryloxy, alkylthio, arylthio, dialkylamino, trialkylsilyl and other similar radicals which are unreactive with the alkali metals sodium and potassium employed in the process of this invention.

Although various separation procedures can be utilized in the process of this invention, it is preferred in most cases to add a small quantity (at least equal to ⅛ of the molar quantity of alkali metal employed) of a tetrahalosilane to react with the sodium alcoholate so as to increase the silicon ester content with subsequent precipitation of sodium chloride thereby facilitating the filtration.

Further the inorganic functional group A as represented in the general formula R″$_3$CA is a functional group of an inorganic acid, that is an anion, such as phosphate, phosphite, sulfate, sulfite, borate, chloride, bromide, iodide, fluoride, silicate, carbonate, and the like.

The following examples, wherein all parts and percentages are by weight, are more fully illustrative of the process of this invention.

Example I

Into a reaction vessel provided with means for heating, stirring, refluxing and continuous addition of reactants was added 50.6 parts of sodium pieces in 563 parts of tetramethoxy silane. The contents of the reaction vessel were heated to 115° C. in a nitrogen stream and slow stirring begun. To this reaction mixture was added 92.5 parts of tertiary butyl chloride while maintaining vigorous agitation (about 5000 r.p.m.). Reaction was immediately initiated as indicated by a temperature increase. The reaction mixture was maintained at 110° C. during the addition of the tertiary butyl chloride by controlling the rate of addition and by applying external cooling, when needed. After the addition was complete the reaction mixture was heated at 110° C. for 30 minutes with agitation. Thereupon, in order to facilitate filtration, the reaction mixture was cooled to 80° C. and 153.1 parts of silicon tetrachloride was added to the reaction mixture in a slow steady stream. When the addition was completed the resultant reaction mixture was cooled and filtered to give 305 parts of liquid. This filtrate was then subjected to distillation at atmospheric pressure. All material distilling two or three degrees below the boiling point of the tertiary butyl trimethoxy silane was removed. The residue was fractionally distilled with a 30 plate column to give 96.8 parts of pure tertiary butyl trimethoxy silane boiling at 143° C. at atmospheric pressure corresponding to a 54.3% yield of the desired product t-BuSi(OCH$_3$)$_3$.

In some instances, in order to further enhance reactivity, catalysts are employed in the process of this invention such as copper amalgam, platinum, palladium, platinum oxide, silver powder, cupric chloride, platinum chloride, lithium chloride, magnesium chloride, and aluminum trichloride.

Example II

Into a reaction vessel provided with means for heating, refluxing, continuous addition, and stirring were placed 19.5 parts of sodium and 145.6 parts of tetraethoxy silane. The contents of the flask were heated to 115° C. in a nitrogen stream and slow stirring begun. Once the sodium had melted, 1 part of a freshly prepared, free flowing copper amalgam (15.2% copper) was added dropwise. The amalgam was prepared by mixing copper powder and mercury in the presence of 50% H$_2$SO$_4$. After the copper was completely dissolved the amalgam was washed with water and dried by pressing with filter paper. After the addition of the amalgam had been completed the nitrogen sweep was discontinued and high speed stirring (about 5000 r.p.m.) of the reaction mixture was begun. 32.4 parts of the tertiary butyl chloride was added continuously to the rapidly stirred reaction mixture over a half hour period. The reaction was immediately initiated as indicated by a temperature rise and a development of a purple color. During the addition period 115° C. was maintained by controlling the rate of addition and applying air cooling when needed. Upon completion of the addition the mixture was maintained at 115° C. for 15 minutes and after this post-addition heating period the reaction mixture was cooled to 80° C. and 28.8 parts of silicon tetrachloride was added to react with the sodium ethoxide present. Thereupon the reaction mixture was cooled to room temperature and diluted with 150 parts of toluene. The resulting reaction mixture was then easily filtered. All material boiling below 165° C. was flashed through a ten plate column. The residue was then fractionally distilled and 104 parts of material distilling between 165° and 185° C. were collected. Analysis of a sample of this material by vapor phase chromatography indicated the presence of 40.8 parts of t-butyl triethoxy silane corresponding to a 53% yield.

Similar results were obtained when 324 parts of t-butyl chloride and 2100 parts of tetra-isopropoxy silane and 195.5 parts of sodium were reacted analogously to the procedure employed in Example II to obtain good yields of the desired t-butyl triisopropoxy silane which had a boiling point of 198° C.

Likewise, employing the process of Example I, tertiary butyl tripentoxysilane, tertiary butyltrieicosoxysilane, and the like are synthesized. Furthermore, the thio derivatives of the aforementioned compounds are synthesized in a similar fashion. Examples of these are tertiary butyltripropylthiosilane, tertiary butyltrimethylthiosilane, tertiary butyltriethylthiosilane, tertiary butyltriisopropylthiosilane, tertiary butyltripentylthiosilane and the like.

Example III

Into a reaction flask provided with means for heating, refluxing, continuous addition and stirring were added 253 parts of chloro triisopropoxy silane and 19.5 parts of sodium. The charge in the reaction vessel was heated to 115° C. and subsequently high speed stirring (about 5000 r.p.m.) was initiated. 32.4 parts of t-butyl chloride were added in a continuous fashion over a half hour period while maintaining a temperature of between about 110° to 120° C. After the addition was completed, the mixture was held at 115° C. for approximately one-half hour then cooled to room temperature and filtered through a layer of diatomaceous earth. The filtrate was then distilled through a ten plate column at atmospheric pressure so as to remove all material boiling 2°–3° C. below 177° C. (the boiling point of the chloro-triisopropoxysilane). Thereupon the residue was fractionally distilled under vacuum at 10 millimeters of mercury to yield the desired t-BuSi(Oi-Pr)₃ boiling at 198° C. (760 mm.).

In a similar fashion employing the process of Example III tertiary butyltrimethoxysilane, tertiary butyltrimethylthiosilane, and 2-phenyl-2-trimethoxysilylpropane are synthesized.

Example IV

Into a reaction flask provided with means for heating, continuous addition, refluxing and stirring was added 80.8 parts of t-butyl trimethoxysilane, and 5 parts of sodium. The mixture was heated to 114° C. with slow stirring and the addition of 9.3 parts of t-butyl chloride was begun. The reaction temperature was controlled at 110° to 115° C. by the addition rate. After the addition was complete heating was continued at 110° for 15 minutes. The reaction mixture was then cooled to room temperature and filtered to give 43 parts of material. Analyses by vapor phase chromatography showed the presence of di-t-butyl dimethoxysilane in substantial yields.

Likewise, employing the process of Example IV, di-tert-butyldiphenoxysilane, bis-(2-methyl-2-butyl)dimethoxysilane, di-tert-butylmethoxytoloxysilane, di-tert-butyl-dimethylthiosilane, tert-butyl-(2-phenyl-2-propyl)-dimethoxysilane, and di-tert-butyldihexadecoxysilane are prepared.

Example V 19.5 parts of sodium and 208 parts of phenyl trimethoxy silane were added to a reaction flask equipped for heating, continuous addition, stirring and refluxing. The contents of the reaction vessel were heated to approximately 115° C. in a nitrogen stream and high speed stirring (about 5000 r.p.m.) was begun. 32.5 parts of t-butyl chloride was added dropwise to the rapidly stirred reaction mixture. The reaction was immediately initiated as indicated by a temperature rise and development of purple coloring. The reaction mixture was maintained at 115° C. by controlling the rate of addition and the utilization of external cooling when necessary. Upon completion of addition the reaction mixture was maintained at 115° C. for 15 additional minutes. It was necessary to employ 100 parts of 2,2,5-trimethyl hexane after about one-third of the t-butyl chloride had been added due to the partial solidification of the reaction mixture. After the addition of the t-butyl chloride was completed the reaction mixture was again partially solidified; but liquefaction was easily effected by the addition of 74 parts of phenyl tri-chlorosilane in 120 parts of 2,2,5-trimethyl hexane and thereafter heating for about 15 minutes at 85° C. Filtration was effected and the filtered reaction mixture subjected to distillation at atmospheric pressure through a ten plate column where all material distilling two to three degree below the boiling point of the phenyl trimethoxy silane starting material (B.P. 110° C./20 mm.) was removed. The residue from this distillation was fractionally distilled at 20 millimeters of mercury. Thus a yield of 39.5% of the desired tertiary butyl dimethoxy phenyl silane boiling at 120° C./20 mm. was obtained.

Example VI

The process of Example V is followed with the exception that 32.5 parts of tertiary butyl chloride, 280 parts of phenyl trimethoxysilane and 70 parts of phenyl trichlorosilane were employed. Furthermore, in this run the phenyl trichlorosilane was added with the tertiary butyl chloride to cause the reaction mixture to remain liquid throughout the course of the reaction. 140 parts of material distilling between 108° and 117° C. at 20 millimeters mercury was collected through a ten plate column. The distillate was then fractionated at atmospheric pressure and a fraction boiling at 220–224° C. was analyzed by vapor phase chromatography to give about 20 mole percent phenyl trimethoxysilane (boiling point 211° C./1 atmosphere) and about 80 mole percent of t-butyl phenyl dimethoxysilane.

It is preferred to conduct the process of this invention in the absence of solvents; however, in some cases, solvents are employed in order to control the temperature of the reaction, improve the flow properties of the mixture, and enhance the contact between reactants thereby decreasing reaction times and increasing yields. When such is the case, inert solvents such as ethers, tertiary amines, and hydrocarbons are employed. Examples of these solvents are ethyl ether, dimethyl ether of ethylene glycol, tributyl amine, trimethyl amine, benzene, toluene, 2,2,5-trimethyl hexene, and the like.

The reaction temperatures employed in the process of this invention can vary over a substantial range dependent upon the properties of the reagents employed. However, undesirable side reactions occur increasingly with increasing temperature until uncontrollable rates of these side reactions inhibit the successful completion of the reaction of the process of this invention—a phenomenon occurring somewhere in the vicinity of 200° C. Moreover, lowering reaction temperatures below 90° C. rapidly decreases reactivity to a point at which initiation does not occur. Thus, in general, the reaction can be conducted between about 90–200° C. However, best yields and reaction rates are achieved at temperatures between about 100°–120° C.

The alkali metals utilized in the process of this invention are generally employed as molten suspensions when the preferred temperatures are employed. A lower reaction temperature can be used in some cases, however. When the temperature at which the reaction is effected is below the melting point of the alkali metal employed, dispersions can be employed.

Ordinarily in practicing the process of this invention, the alkylating agent represented above by the general formula R″₃CA is added to the reaction mixture containing the organic ester of silicon and the alkali metal. However, another mode of addition which can be employed is the addition of the alkali metal to a mixture of the R″₃CA and the organic ester of silicon. Thus by controlling the mode of addition, it is thereby possible to increase alkylation and lessen decomposition through the in situ formation of the organometallic.

In some instances higher yields are obtained if the salts of metals forming less reactive organometallics, such as, calcium, barium salts and the like are employed in the process of this invention. This procedure is illustrated by the following exemplary sequence of reactions:

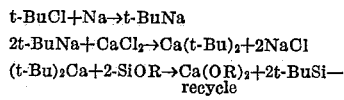

The following working example is illustrative of the mode by which such salts of metals are utilized in the process of this invention.

Example VII

In the process of Example I, 2,427 parts of t-butyl trihexadecoxysilane, 57.5 parts of sodium, 500 parts of 2,2,5-trimethylhexane and additionally 7.6 parts of calcium chloride are added to the reaction vessel. To this reaction mixture 93 parts of t-butyl chloride are added in a dropwise fashion and the process of Example I is followed throughout the remainder of the reaction. The product di-t-butyldihexadecoxysilane is isolated by distillation.

In the above examples, the reaction was effected through the employment of sodium as one of the reagents. However, in each of the above instances, potassium can be substituted with equal facility; nevertheless, due to economic considerations sodium is preferably employed. The following working example illustrates the use of potassium in the process of this invention.

Example VIII

In the process of Example I, 86 parts of potassium is employed instead of 50.6 parts of sodium to yield the product tert-butyltrimethoxysilane which boils at 143° C. at atmospheric pressure.

The principal utility of the silanes produced by the process of this invention is in the production of siloxanes. The silanes can be readily converted to produce di- and polysiloxanes. Furthermore, condensation can be employed to produce copolymers. Thus, the following working example, wherein one of the reactants is a silane produced by the process of this invention, is illustrative of the preparation of polysiloxanes.

Example IX

Into an autoclave, provided with means for agitation, heating, and venting of off-gases, is added 162 parts of pure tert-butylmethyldimethoxysilane, 129 parts of pure dimethyldichlorosilane, and 4 parts of ferric chloride. The reaction mixture is heated at a temperature of 100° C. for a period of one hour at the end of which the autoclave is cooled to room temperature. The reaction mixture is a linear polymer containing the repeating units

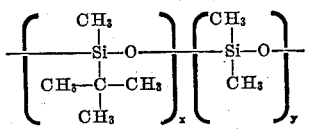

This compound, when employed as a primary lubricant in the main bearing of a gas turbine of a high performance jet aircraft engine, provides good lubrication under all flight conditions encountered.

Likewise, the monomeric substances produced by the process of this invention, when transformed in the above manner, find utility in applications such as damping media, heat exchange media; as lubricants and hydraulic fluids in applications such as jet aircraft engines, high temperature conveyors, switch gears, bomb-bay rack mechanisms, gyro-bearings, fan motors operating at high temperatures, motors in aircraft and on shipboard, control valves, automobile window channels, and the like.

Furthermore, the compounds produced by the process of this invention wherein the alkoxy substituents contain long chain hydrocarbon exhibit excellent thermal characteristics and are excellent oil vehicles due to the improved hydrocarbon properties which result from the high proportion of hydrocarbon in the compounds produced. Additionally, the compounds produced by the process of this invention have a low vapor pressure, wide temperature range and low viscosity. Thus these properties combined with high thermal stability and resistance to both chemical and oxidation attacks make these compounds ideally suited for lubricant applications where conventional materials such as hydrocarbon lubricants are not satisfactory. A typical example of such use of these compounds is t-butyl trilauroxy silane when employed in substantially pure form as a primary lubricant in the main bearing of the gas turbine of a high performance jet aircraft engine. Under flight conditions, this compound provides good lubrication under all conditions encountered.

We claim:
1. A process which comprises reacting, at a temperature between about 90 to 200° C., an alkali metal selected from the group consisting of sodium and potassium, a tertiary lower alkyl halide and an organic ester of silicon selected from the group consisting of trialkoxy, tetra-alkoxy, triaryloxy, tetra-aryloxy, trialkyl thio, tetra-alkyl thio, triaryl thio and tetra-aryl thio silanes, said tertiary alkyl halide being further defined as having said halide linked directly to the tertiary carbon atom, the organic portion of said organic ester being selected from the group consisting of alkyl and aryl hydrocarbon groups, and substituted alkyl and aryl hydrocarbon groups, the substituents of said substituted hydrocarbon groups being selected from the group consisting of alkoxy, aryloxy, alkyl thio, aryl thio, dialkyl amino and trialkyl silyl groups.

2. A process comprising reacting sodium, tertiary butyl chloride, and a composition $R_xSi(OR')_yX_z$ wherein R and R' are selected from the group consisting of hydrocarbon groups and substituted hydrocarbon groups, which may be the same or different, containing between about 1 to 10 carbon atoms, said substituents being selected from the group consisting of alkoxy, aryloxy, alkylthio, arylthio, dialkylamino and trialkylsilyl, X is a halogen, $x$ is an integer having a value of 0 to 1 inclusive, $y$ is an integer having a value of 3 to 4 inclusive, $z$ is an integer having a value of 0 to 1 inclusive such that the quantity $x+y+z$ has a value of 4, said process being conducted at a temperature of between about 100 to 120° C.

3. As new compositions of matter tertiary alkyl alkoxy silanes, containing 2 through 3 alkoxy groups, wherein said alkoxy groups comprise long-chain hydrocarbon groups containing from about 10 through about 20 carbon atoms.

4. As new compositions of matter tertiary-alkylalkoxy-silanes, containing 2 through 3 alkoxy groups, wherein said alkoxy groups comprise long-chain hydrocarbon groups selected from the group consisting of decyl, lauryl, hexadecyl and eicosyl.

5. Tertiary-butyltri-eicosoxysilane.
6. Tertiary-butyltri-decylthiosilane.
7. A process according to claim 1 wherein said alkali metal is sodium, said tertiary lower alkyl halide is tertiary butyl chloride, and said organic ester of silicon is a tetraalkoxy silane in which each alkoxy group contains from 1 to about 5 carbon atoms.

References Cited in the file of this patent

UNITED STATES PATENTS

| | | |
|---|---|---|
| 2,238,669 | Wiley | Apr. 15, 1941 |
| 2,386,452 | Fleming | Oct. 9, 1945 |
| 2,477,704 | Sowa | Aug. 2, 1949 |
| 2,486,162 | Hyde | Oct. 25, 1949 |
| 2,521,267 | Tiganik | Sept. 5, 1950 |
| 2,626,270 | Sommer | Jan. 20, 1953 |

FOREIGN PATENTS

| | | |
|---|---|---|
| 573,906 | Great Britain | Dec. 12, 1945 |
| 612,822 | Great Britain | Nov. 18, 1948 |
| 657,442 | Great Britain | Sept. 19, 1951 |
| 668,532 | Great Britain | Mar. 19, 1952 |